United States Patent [19]

Albanese et al.

[11] 4,042,925
[45] Aug. 16, 1977

[54] PSEUDO-RANDOM CODE (PRC) SURVEILANCE RADAR

[75] Inventors: Damian F. Albanese, Chatsworth; Frank J. O'Farrell, Valencia; David E. Hammers; Henry R. Kennedy, both of Los Angeles, all of Calif.

[73] Assignee: International Telephone and Telegraph Corporation, New York, N.Y.

[21] Appl. No.: 634,890

[22] Filed: Nov. 24, 1975

[51] Int. Cl.² .......................... G01S 9/23; G01S 9/24
[52] U.S. Cl. ........................................ 343/14; 343/17.5
[58] Field of Search ...................... 343/14, 12 R, 17.5

[56] References Cited

U.S. PATENT DOCUMENTS 3,396,392  8/1968  Fishbein et al. ..................... 343/14
3,641,573  2/1972  Albanese .......................... 343/12 R
3,868,686  2/1975  Magorian ......................... 343/17.5

Primary Examiner—Charles T. Jordan
Attorney, Agent, or Firm—William T. O'Neil

[57] ABSTRACT

A CW pseudo-random-coded (PRC) radar system including a triple-clock arrangement. The three slightly different clock frequencies are sequentially employed to generate the bi-phase coded RF transmissions and the received echo signals are separately bi-phase demodulated by code bit. Clutter filtering and sampling in both I and Q channels by a commutating element are employed. Video processing, preferably of the FFT type, is provided as is range-ambiguity processing. The system provides resolution of range ambiguities over a long total range permitting the PRC word length and other system parameters to be optimized for elimination of Doppler ambiguities.

15 Claims, 19 Drawing Figures

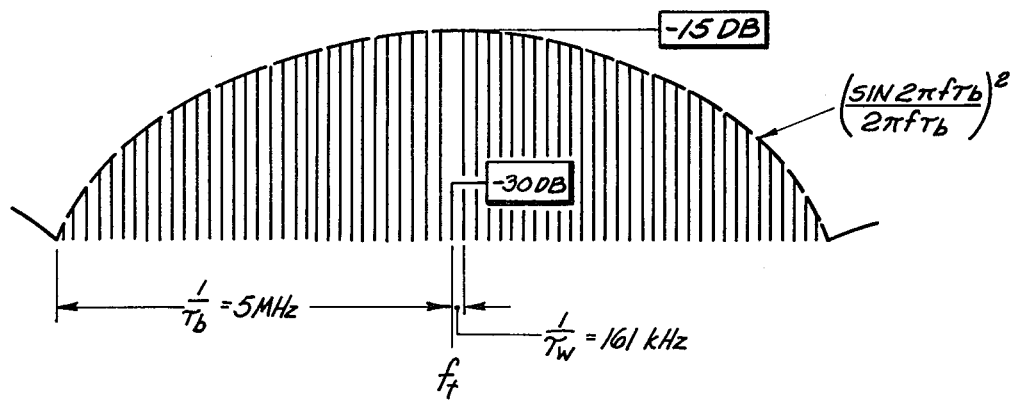
FIG. 2.
$f_t$ = RF CENTER FREQUENCY
$T_b$ = PRC BIT WIDTH (200 NSEC)
$T_w = LT_b$ = 6200 NSEC
$L$ = 31 PRC BITS/WORD
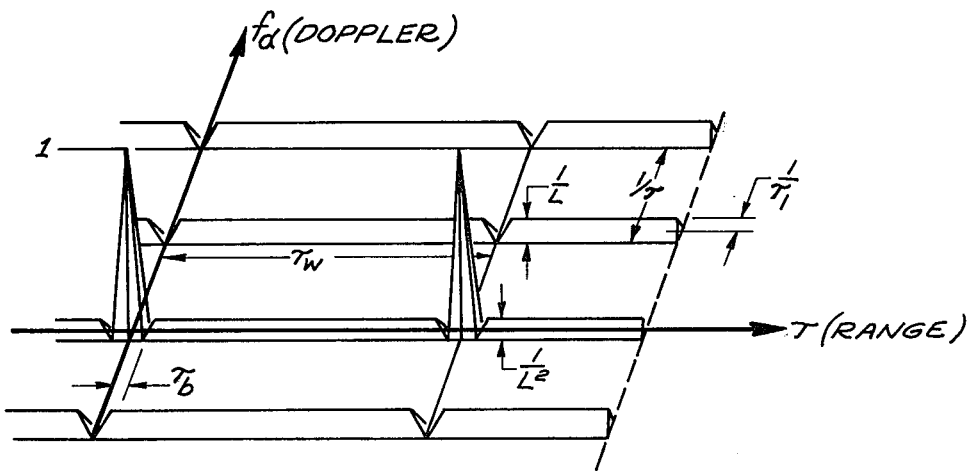
FIG. 3. PRC RADAR AMBIGUITY DIAGRAM

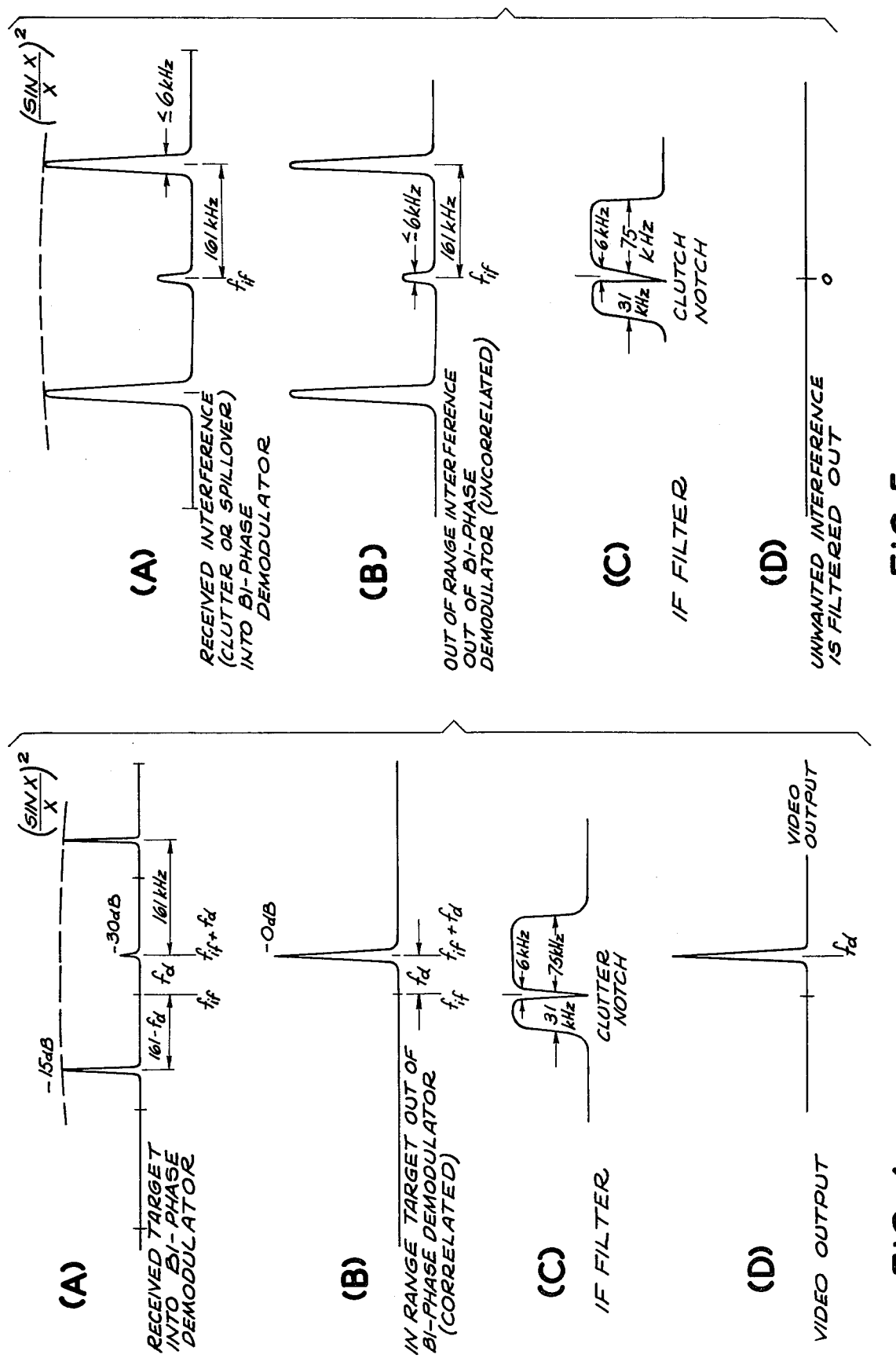
FIG. 5. OUT-OF-RANGE CLUTTER
FIG. 4. IN-RANGE TARGET

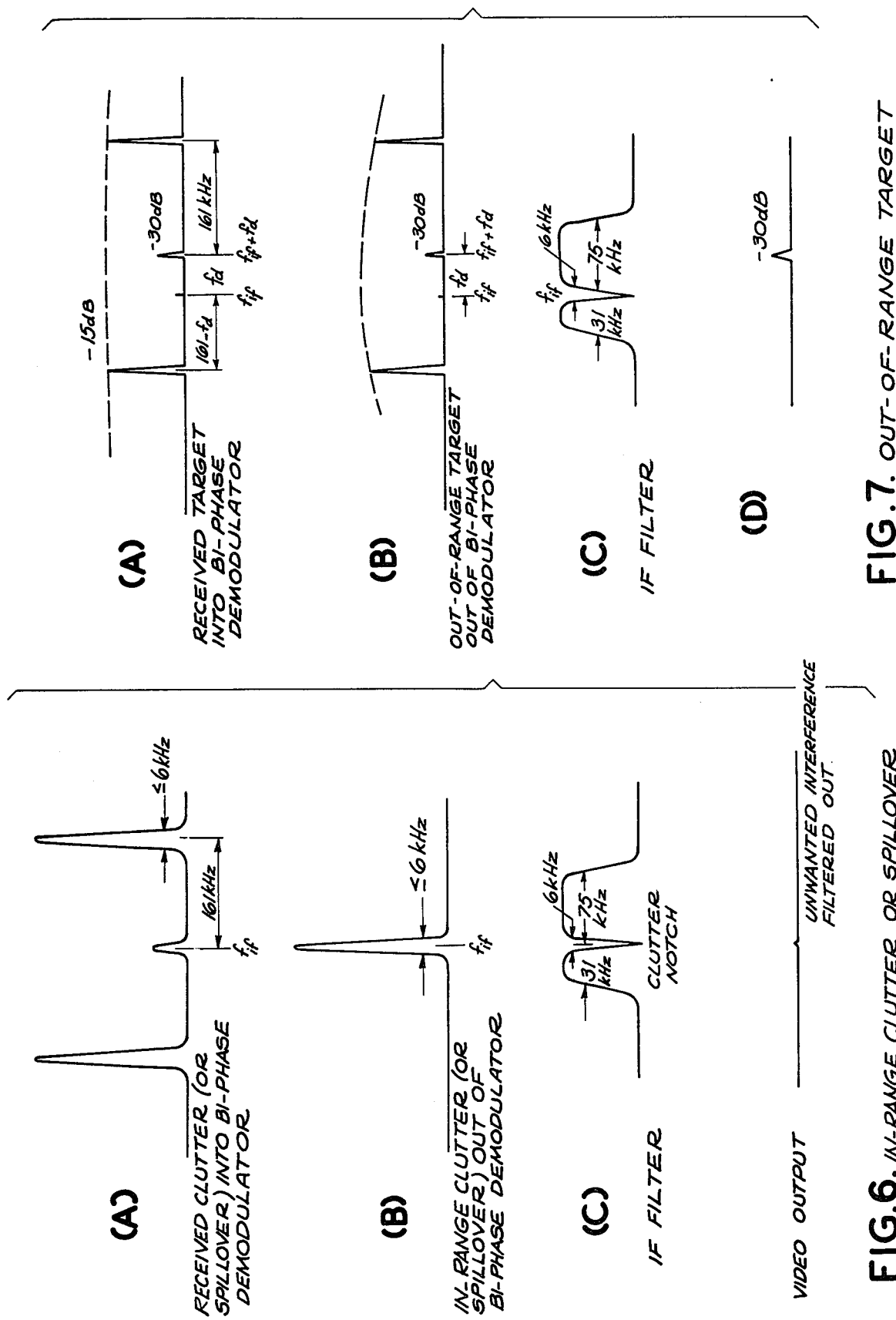

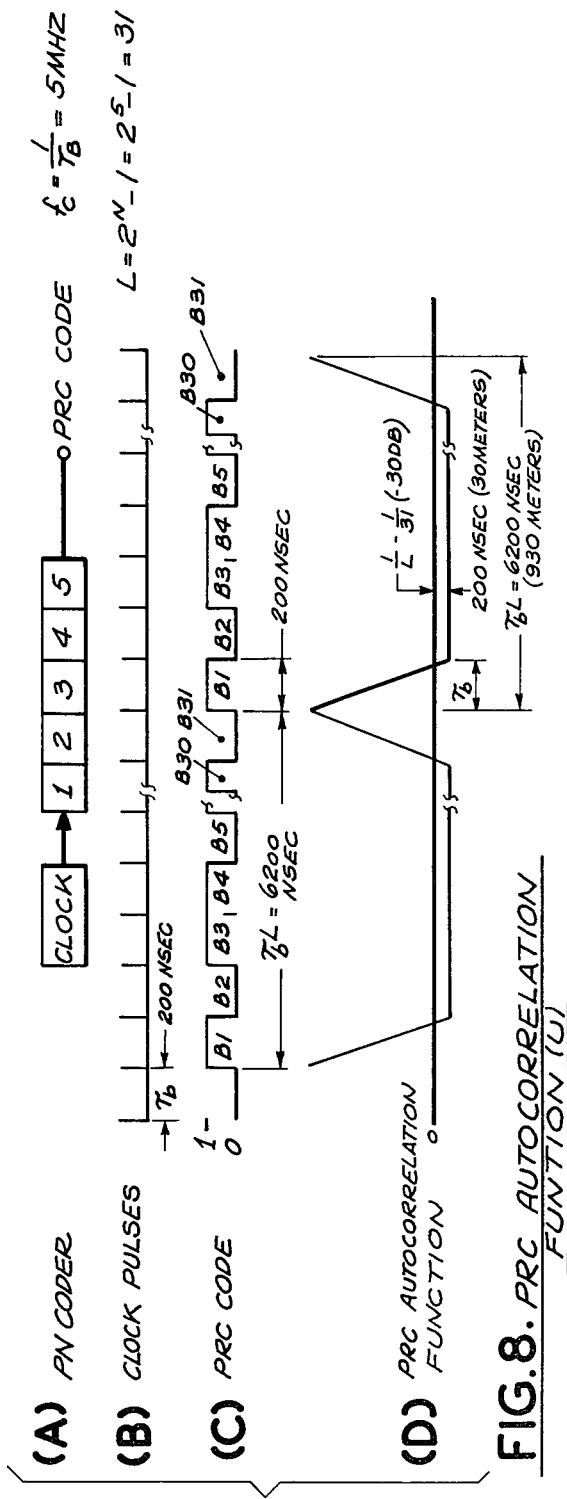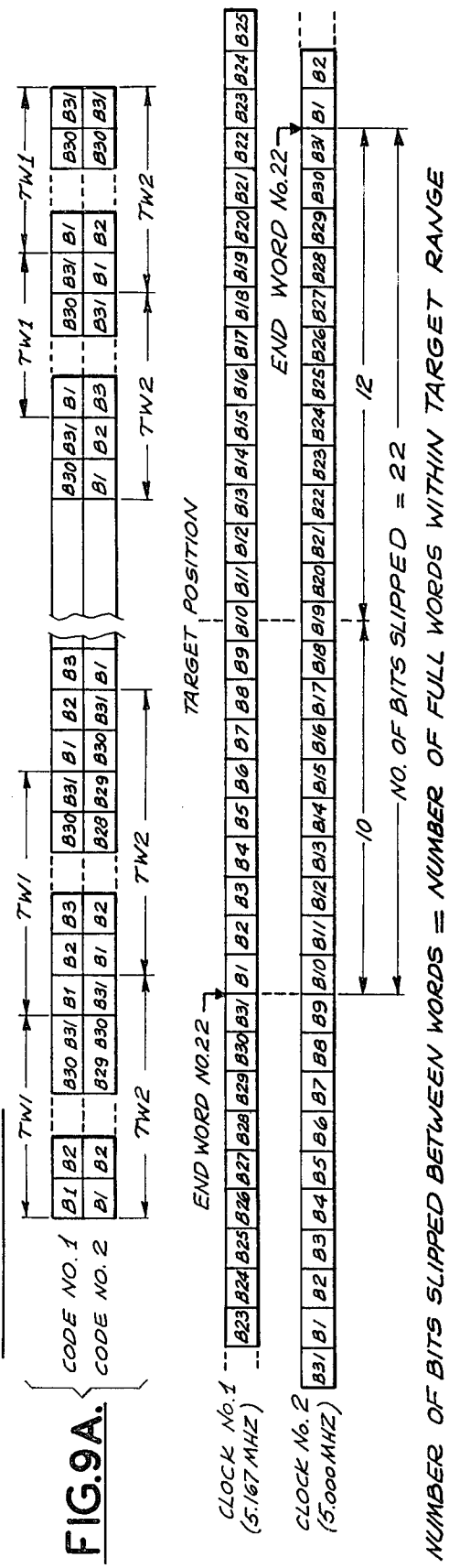

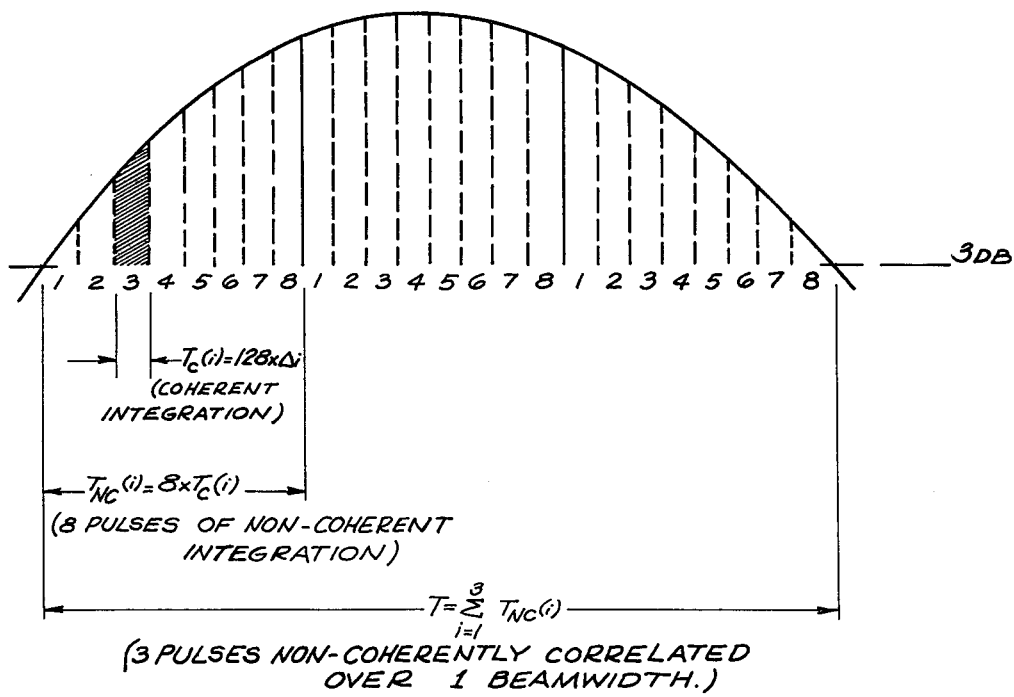
FIG. 10.
TIME SEQUENCING OF COHERENT AND NON-COHERENT PROCESSING
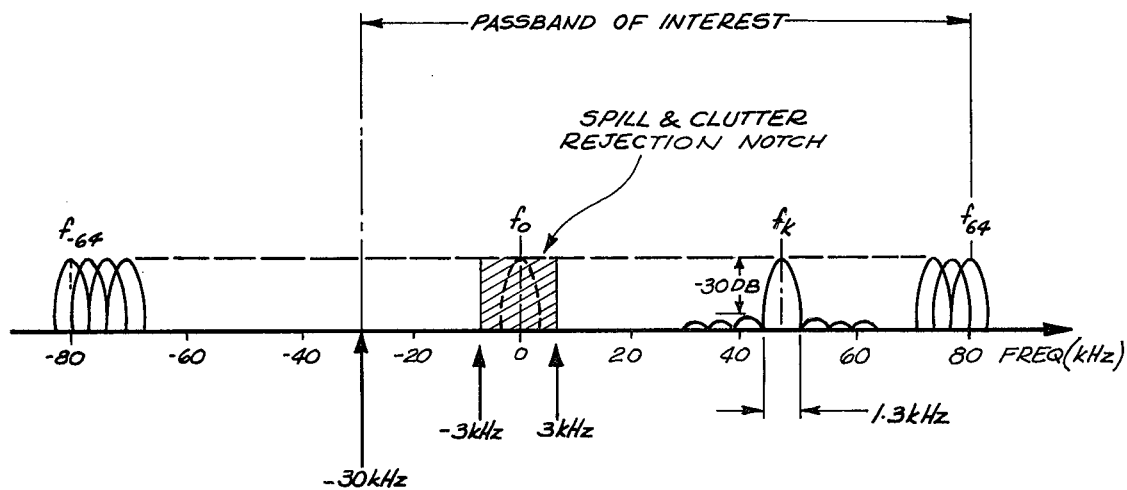
$f_k = k\text{th FILTER} \quad |k| < 64$
FIG. 11. FAST FOURIER TRANSFORM FILTER BANK OPERATION

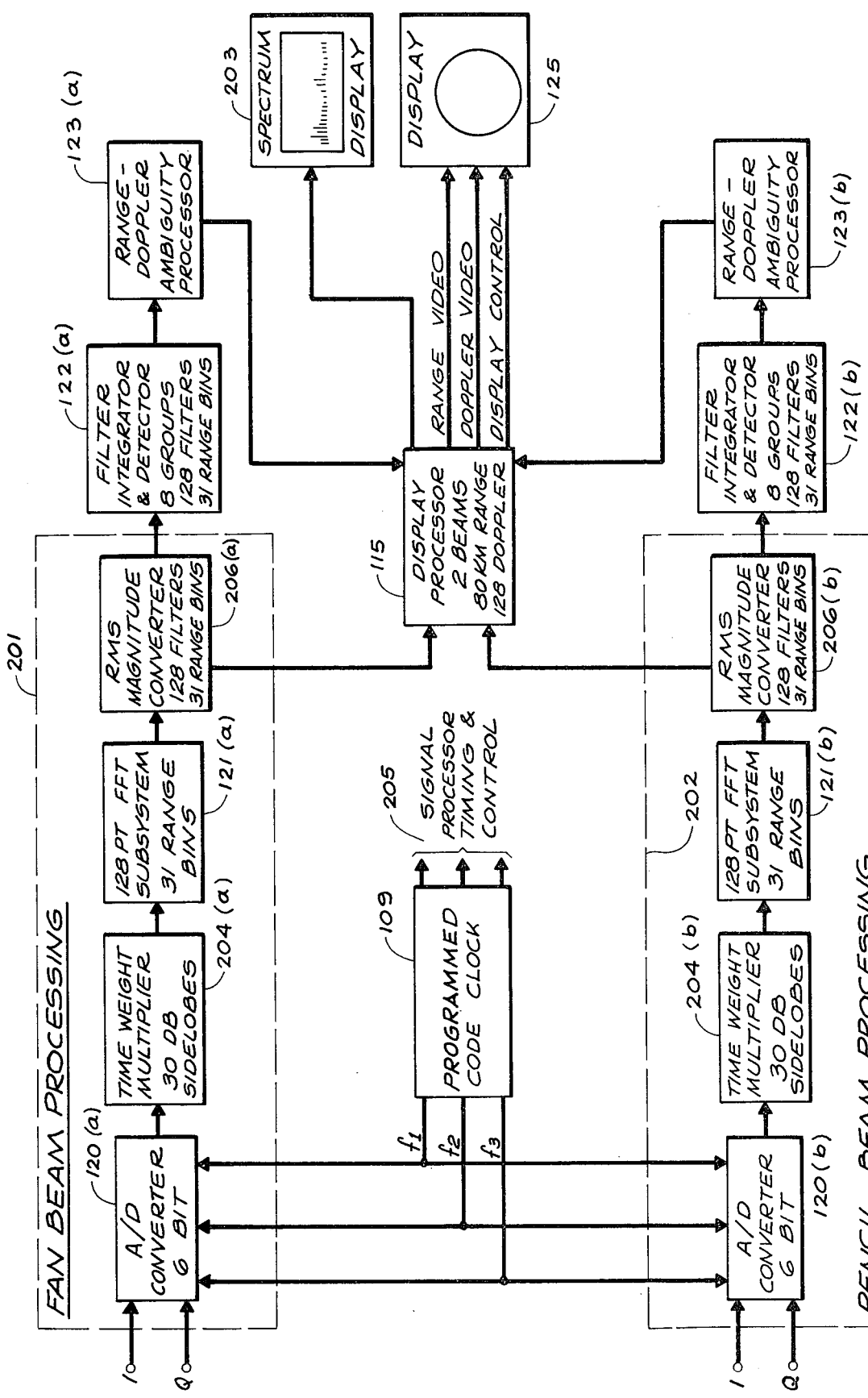
FIG.12. DIGITAL SIGNAL PROCESSOR

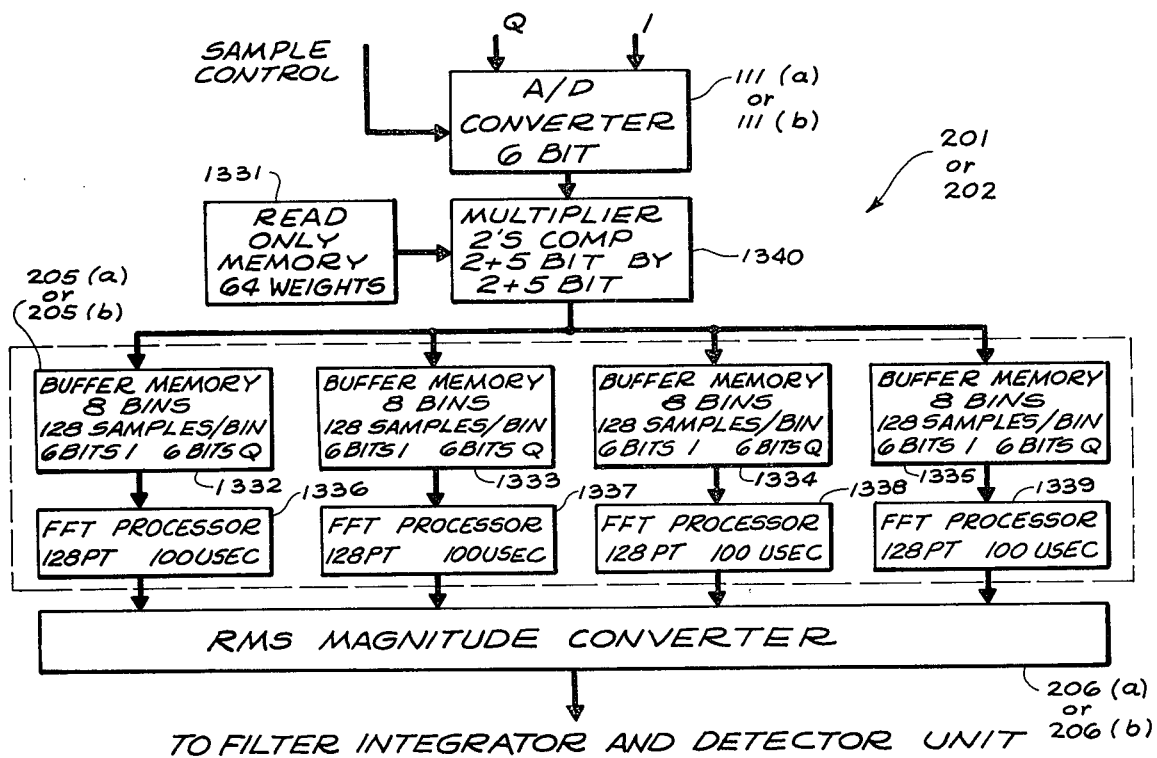
FIG. 13. FFT PROCESSOR
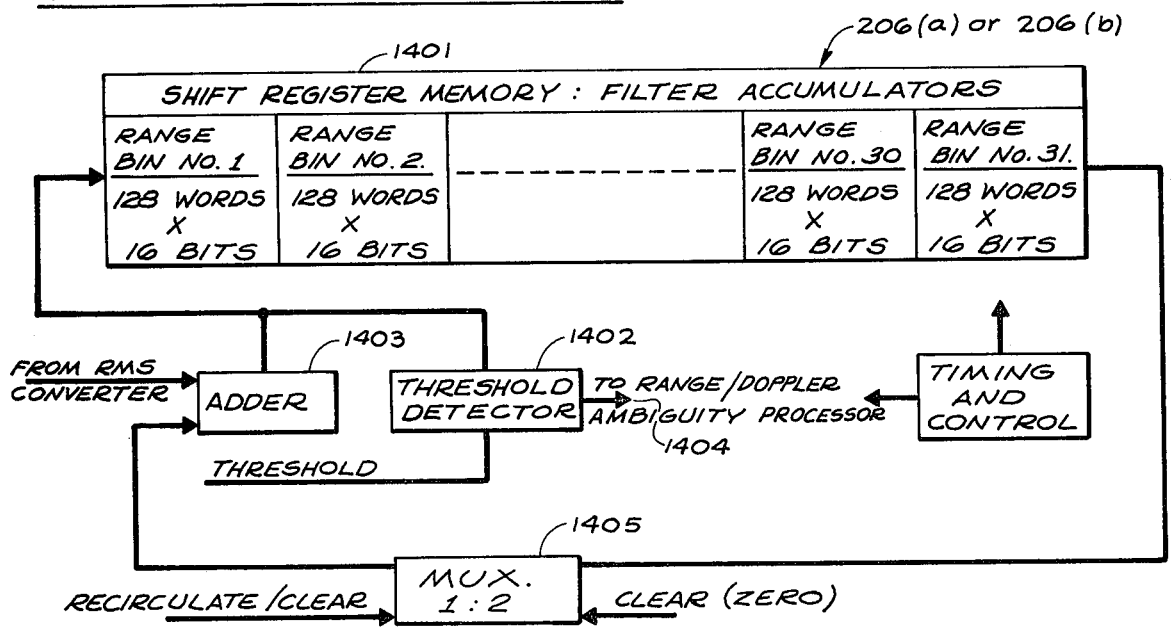
FIG. 14. FILTER, INTEGRATOR AND DETECTOR

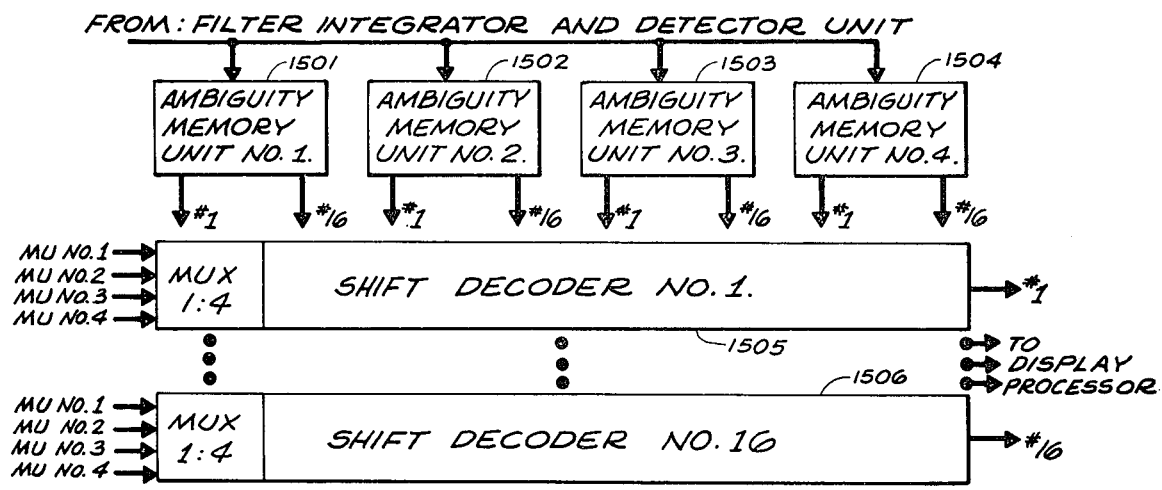
FIG. 15. RANGE/DOPPLER AMBIGUITY PROCESSOR
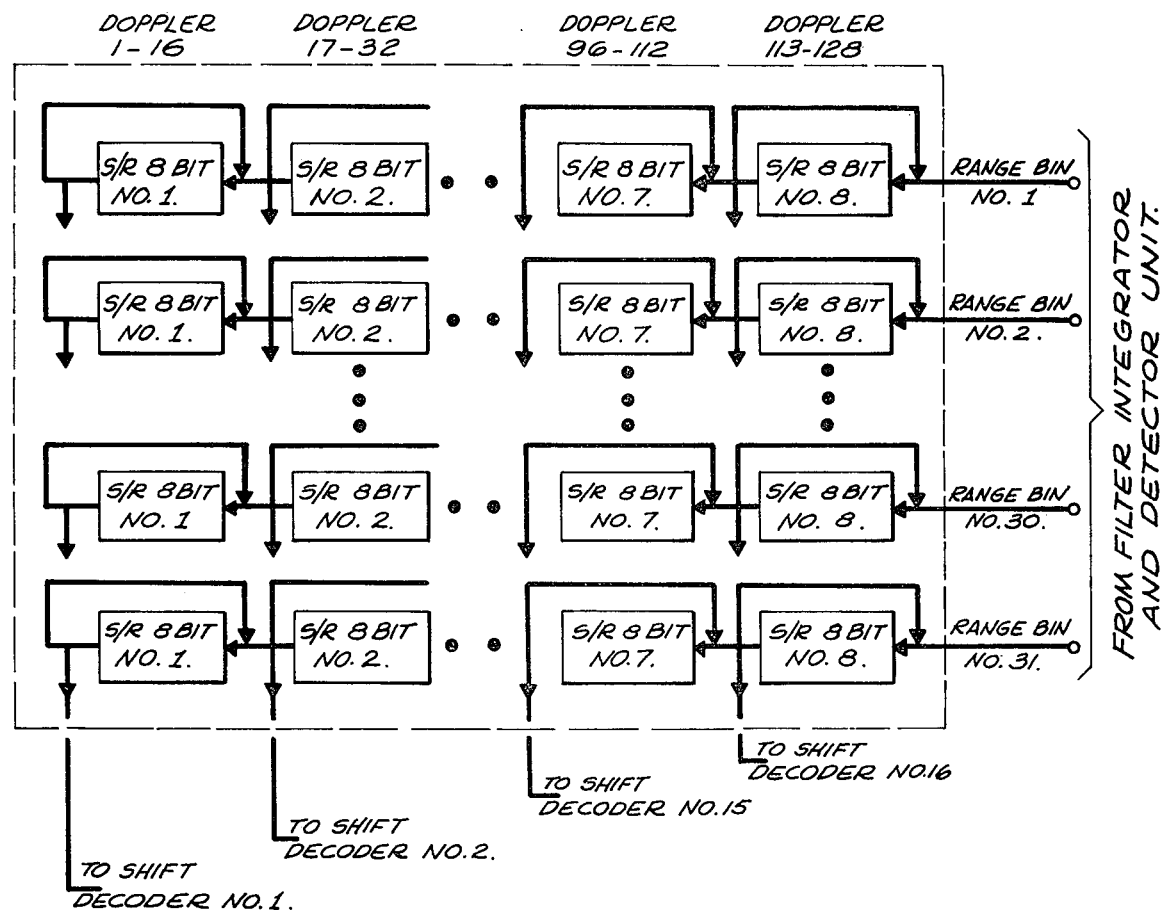
FIG. 16. RANGE/DOPPLER AMBIGUITY MEMORY UNIT (1 OF 4)

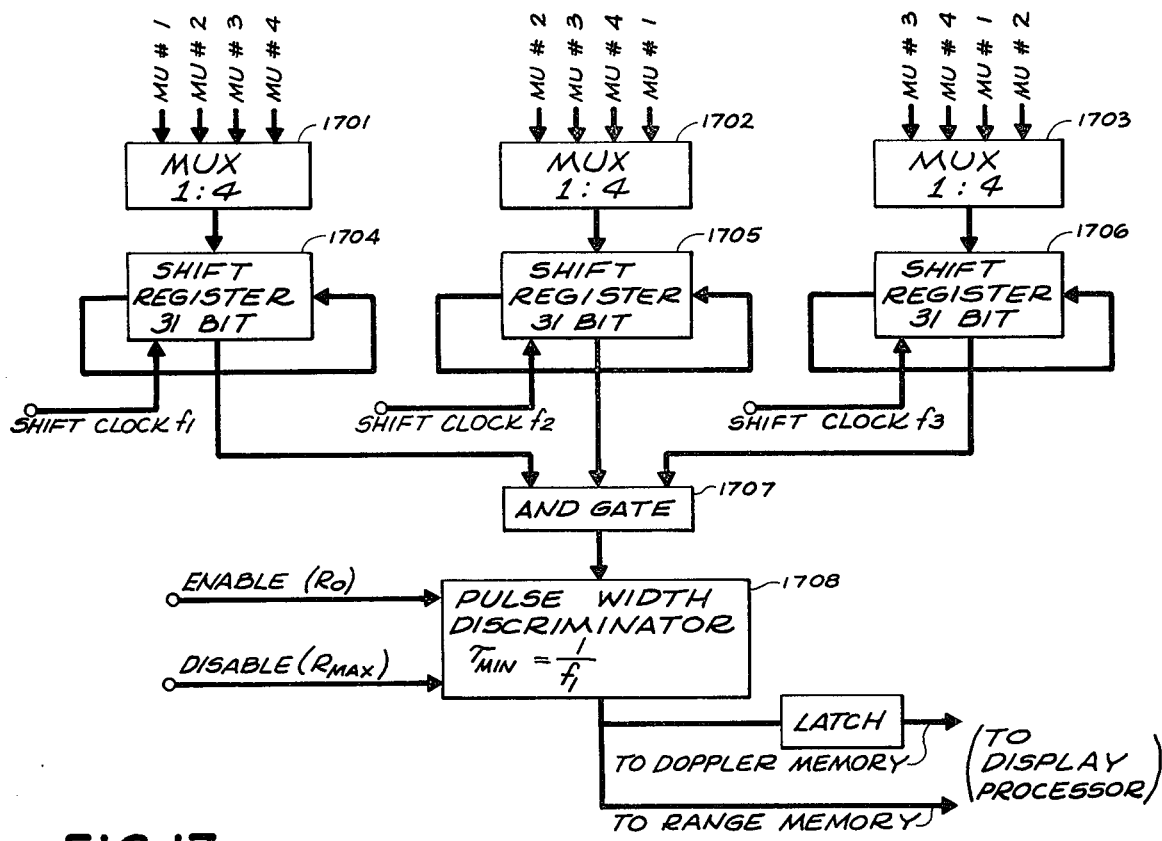
FIG. 17. SHIFT DECODER
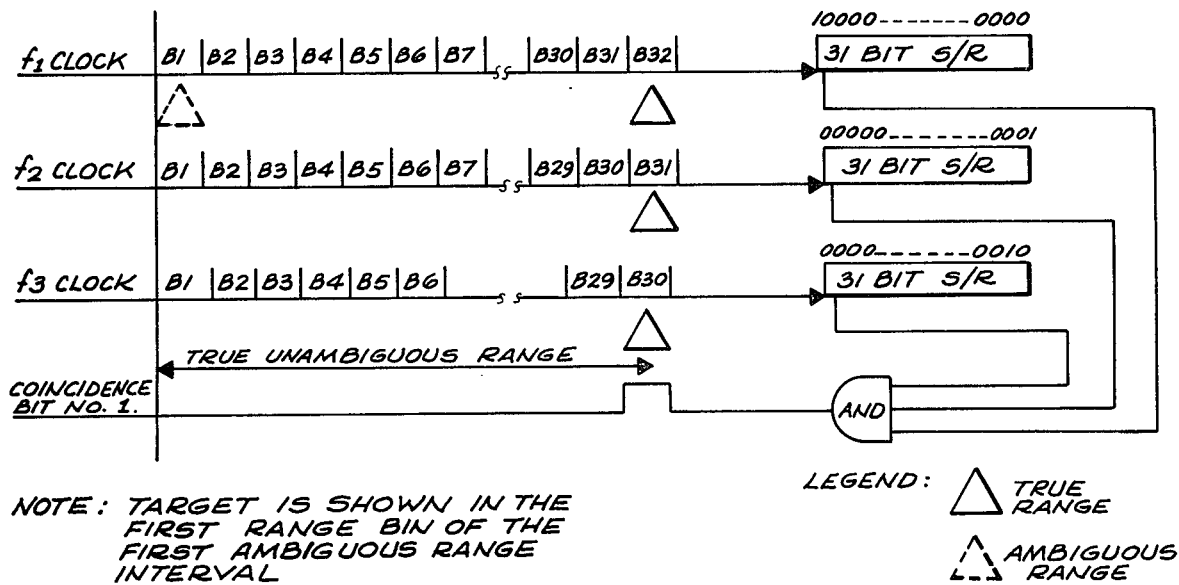
FIG. 18. SHIFT DECODER TIMING DIAGRAM

PSEUDO-RANDOM CODE (PRC) SURVEILLANCE RADAR

BACKGROUND OF THE INVENTION

1. Field of the Invention

The invention relates generally to radar devices and more particularly, to continuous-wave radar devices which utilize pseudo-random coded, bi-phase modulation.

2. Description of the Prior Art

In the radar system arts, the so-called pseudo-random coded (PRC) system is known both in continuous-wave (CW) radar systems and also in pulse radar. In pulsed radar a predetermined code is selected over a comparatively long transmission pulse, and then pulse compression is employed at a receiving station, which may be a remote location or at the same location as the transmitter in which case the useful received signals are normally those reflected from distant objects.

In CW pseudo-random systems, a much longer code word is employed, more correctly referred to as a maximal length code. Such codes are imposed on the radio frequency carrier of the transmitter as a series of discrete transmitter phase levels, usually zero and 180° phases of the carrier signal between these two discrete levels and, accordingly, the modulation is referred to as bi-phase. When received and detected, these discrete bi-phase signals are readily converted to a corresponding series of 1 and 0 video levels which appear to occur randomly. Actually, however, they are recurrent after L bits and, therefore, are called pseudo-random codes (PRC).

The state of the art in respect to both pulsed and CW radar systems employing pseudo-random codes or sequences, as they are sometimes called, is extensively described in the technical literature. For example, the textbook "Radar Handbook" by Merrill I. Skolnik (McGraw-Hill 1970), summarizes the subject and provides additional bibliographic references. The general methods of instrumenting the generation of pseudo-random sequences in the transmitting equipment of such a radar are described in Chapter 20 of that text. The so-called auto-correlation property of the maximal length pseudol-random sequence is also described.

Notwithstanding the advantages of CW radar, in respect to high average power on target and other matters, there are certain prior art problems associated with CW PRC radars which have tended to limit their usefulness and the realization of their inherent advantages. Phenomena such as "blind-speeds" and range and velocity ambiguities are among the phenomena limiting the usefulness of CW PRC in the prior art. The causes of such ambiguities are well understood, and the general subject is discussed in Chapter 3 of the aforementioned reference textbook.

Pseudo-random coded sequences are readily generated using digital techniques. A clock-pulse generator is arranged to feed a coder-shift register which is wired with the appropriate feedback. The resultant output of the coder is a series of 1 and 0 video levels which, as hereinabove indicated, appear to occur randomly. After L bits, the sequence repeats a code word of length L, related to the number of shift register stages N by the equation $L = 2^N - 1$. Accordingly, a five-stage register results in a 31 bit code. This code in video form is then fed to an RF bi-phase modulator where it encodes the bit sequence onto a carrier in a corresponding sequence of 0 and $\pi$ phase, according to the PRC code. The resultant signal is wideband (approximately twice the code clock-rate) and contains the coding information.

The auto-correlation of the sequence is generated by delaying the code in time (or automatically delaying it in accordance with range in a radar system) with respect to the same code, multiplying the two codes, and then integrating. For maximal length pseudo-random codes, the resultant auto-correlation function always has the same shape, thus, when the codes are aligned in time (or range) i.e., bit 1 with bit 1, bit 2 with bit 2, etc., throughout the code, the integrator output is maximum and equal to L units of amplitude. When the displacement between the received and reference (local) codes is one or more bits, the output drops to a value of -1 and thus, the resolution achievable in time or range, is equivalent to that achieved in a conventional pulse system with a pulse-width equal to $\tau_b$, the bit width.

In the prior art, various ways have been devised for dealing with one or the other of the inherent ambiguities in a PRC CW radar system, one of these being described in U.S. Pat. No. 3,641,573. In the device described in that patent, a tone is used so that a gross range value can be determined and used to resolve the ambiguities inherent in the range measurement with a limited length transmitted code less than the range of the received signal. In effect, in that device, the pseudo-random code provides a vernier range measurement.

A PRC radar system will generally improve overall performance as compared to CW radars of the FM type of 15 to 30 dB in the environments of spillover and clutter. Spillover represents a major problem with all CW type radars. Spillover, in this context, means the undesired direct energization of a receiver from the transmitter, and/or reflected close-in clutter. That particular problem is extant because of the fact that time-sharing is not possible as with pulsed radars.

By using PRC concepts in a radar system, a reduction in spill-over by $1/L^2$ (30dB for a 31 bit code) as compared with spillover signal levels encountered in unmodulated CW radar (all other factors considered to be constant). In the first (nearest) range bin or range increment, there may be no advantage over unmodulated CW radar, however, at longer ranges, the advantage is substantial.

In respect to "out-of-range clutter, response is down 30 dB in the 31 bit code PRC arrangement" (because of correlation rejection), below that of a CW unmodulated radar and is therefore negligible. In-range clutter does correlate in the detection process of a PRC system, but represents on the average only 1/L (1/31 in the case of the 31 bit code aforementioned) of the total clutter power reflected to the receiver of a CW radar. This constitutes an improvement on the order of 15dB.

The manner in which the device of the present invention provides unambiguous range measurement and also unambiguous Doppler determination will be understood as this description proceeds. Moreover, the advantages of the present system over other prior art approaches to the general problem will become apparent.

SUMMARY OF THE INVENTION

In consideration of the disadvantages of prior art systems, it may be said to have been the general objective of the present invention to produce a CW PRC radar system substantially free of target and range ambiguities and having no "blind-speeds" within a relatively long predetermined maximum range and up to a relatively large predetermined maximum target velocity.

The combination of the present invention involves the use of a PRC CW transmitting format with a programmed clock frequency applied to the PRC coder. This programmed clock frequency is essentially a triple-staggered arrangement in which the frequencies are selected, such that the target will be identified in a different bit of the code word in each of the three staggered intervals thus provided. In the receiver, the received echo is sent to a first mixer via the receiving antenna. The received wideband echo signal (and clutter) is down-converted to an IF frequency ($f_{if}$) and amplified by a wideband amplifier. This amplified signal is then sent to 30 parallel range channels. Each of these channels contains a bi-phased demodulator fed by a discrete bit of the transmitted (reference) code, each of these channels thereby being delayed by 1 bit from the preceding channel. The L delayed reference codes are generated in an L - tap shift register fed from the PRC coder with an inherent one code bit of delay time between taps. Since the repeating transmitted code word contains l bits (range bins or range increments) the 31 parallel range channels cover all possible ranges. The L channels of receiver detection each have I and Q outputs, and these are rapidly and successively sampled by a commutator. From the commutator, fast Fourier transform (FFT) processing, including filtering and detection, is applied. Subsequently, range ambiguity processing is performed. This range ambiguity processor comprises a shift register range/Doppler processor. The range ambiguity processor essentially recognizes the discrete range represented by the correlation pulse corresponding to each given target from the code bit (out of the L bits) into which it falls in each of the successive clock frequency intervals and eliminates ambiguous correlations appearing at other than the unambiguous range. In this respect, the range ambiguity processing is analogous to blind speed elimination in a staggered PRF pulse radar system.

The manner in which the present invention may be implemented in a practical system will be understood from the detailed description hereinafter.

BRIEF DESCRIPTION OF THE DRAWINGS

FIG. 2 represents the transmitted pseudo-random-coded spectrum transmitted by the device of FIG. 1.

FIG. 3 is a graphic representation of range and velocity (Doppler) ambiguities commonly encountered in CW Pseudo-random-coded radar systems (ambiguity diagram).

FIGS. 4 and 5 depict receiver waveform and filter characteristics as applied to various signals.

FIGS. 6 and 7 depict signal conditions as in FIGS. 4 and 5, applied to an out-of-range target having an in-band Doppler frequency.

FIGS. 8(a) through (d) depict the generation of the PRC code employed in FIG. 1 and the auto-correlation function therefor.

FIGS. 9(a) and 9(b) depict clock-code comparisons and the basis for unambiguous range measurement in the system of FIG. 1, respectively, illustrating two of the three code-clock rates for the system of FIG. 1.

FIG. 10 illustrates the time sequencing of coherent and non-coherent processing of receive signals in the system of FIG. 1.

FIG. 11 depicts fast Fourier transform filter bank operation in the system of FIG. 1.

FIG. 12 depicts the digital signal processor in block diagram form as included in the system of FIG. 1.

FIG. 13 is a more detailed block diagram of the fast Fourier transform processor of FIG. 12.

FIG. 14 is a schematic block diagram of the filter, integrator and detector devices of FIG. 12.

FIG. 15 is a more detailed block diagram of the range/Doppler ambiguity processor of FIG. 12.

FIG. 16 is a more detailed block diagram of the range/Doppler ambiguity memory untis of FIG. 15.

FIG. 17 is a more detailed schematic block diagram of the shifter decoder devices of FIG. 15.

FIG. 18 is a timing diagram depicting the operation of the shift decoder illustrated in FIG. 17.

DESCRIPTION OF THE PREFERRED EMBODIMENT

Figure 1:
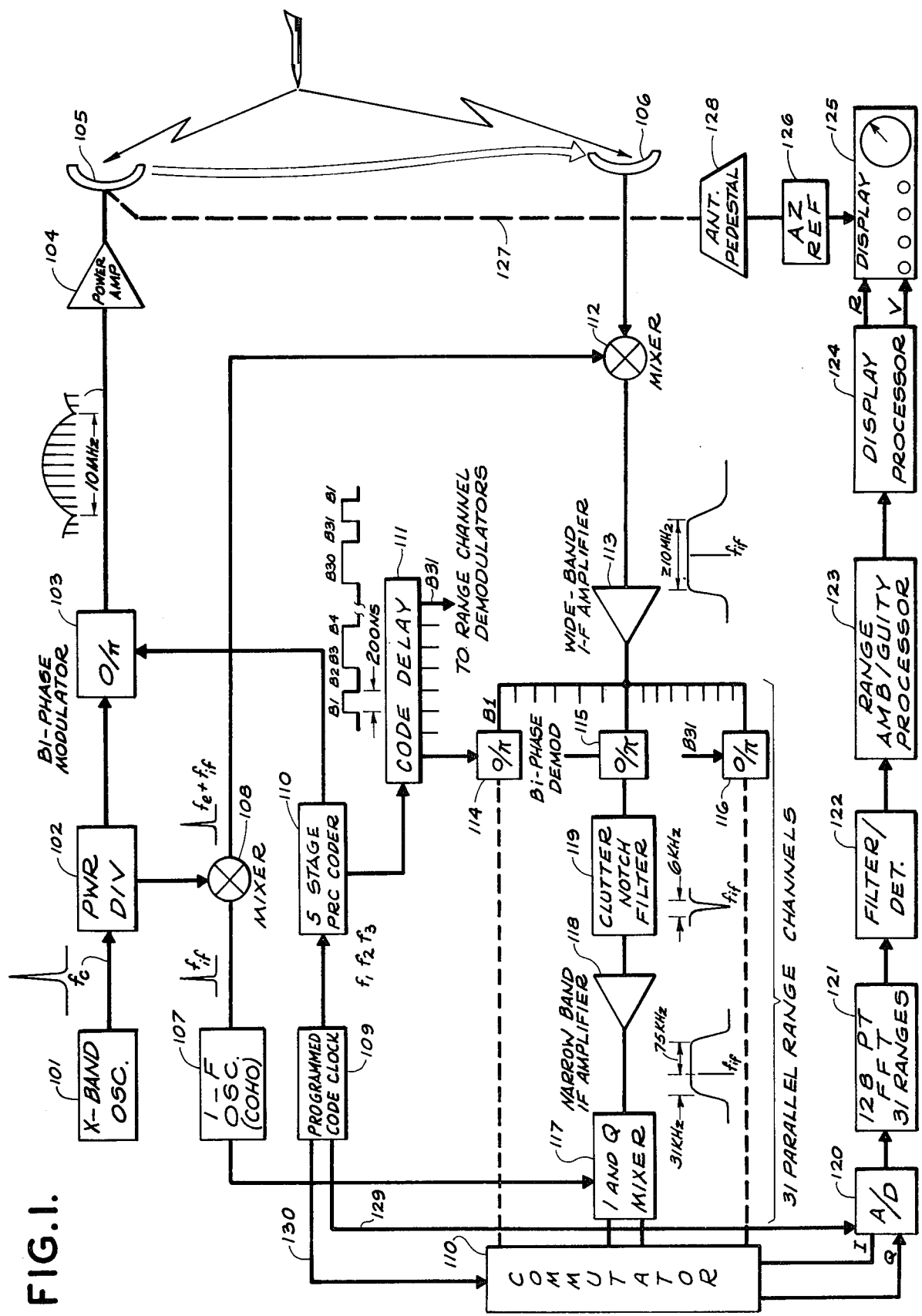
FIG. 1 is an overall system block diagram illustrating an application of the present invention.

Referring now to FIG. 1, the schematic block diagram of a typical system in accordance with the present invention will be described.

Certain typical operating parameters have been chosen for the sake of this description, and these will be evident as the description proceeds. The reason for particular parameter selections will also be understood as the description proceeds.

It has been assumed that the RF operating frequency of the system is in the X-band, for example. Accordingly, the X-band oscillator 101 may include a CW microwave generator (a klystron for example) or a MOPA arrangement. The latter alternative offers the opportunity of better providing the type of short-term stability required by a coherent system, as employed in the system of FIG. 1. In any case, the techniques for implementing block 101 are readily available to those skilled in this art.

The output of block 101 is identified as $f_c$ and is, as nearly as practical, a single (very narrow spectrum) RF signal. Power divider 102 passes most of the output of 101 to the bi-phase modulator 103, however, a small amount is diverted to mixer 108 to implement the receiving functions to be hereinafter described.

As previously indicated, range ambiguity resolution is effected by programming the code clock, for example, at three different sequential frequencies, so that ambiguous targets do not remain at constant range, and therefore, can be out-ruled by subsequent logic circuits.

In the present example, a five stage conventional PRC coder 110 driven from the three-frequency (programmed) clock 109 producing, in accordance with well-known critera, a 31 bit PRC word. Before further describing the arrangement of FIG. 1, it is desirable to discuss the typical selection of design parameters, and the nature of the basic transmitted signals.

Referring momentarily to FIG. 3, a familiar ambiguity diagram is depicted, especially adapted to the system of FIG. 1. This diagram of FIG. 3 depicts the matched radar receiver response to the transmitted code in target Doppler ($f_d$) and range ($\tau$) coordinates. The significant features are that the separation between response lobes in the Doppler frequency axis are $1/\tau_w = 1/L\tau_b$, and the ambiguous range is $\tau_w = L\tau hd b$. The out-of-range zero Doppler lobes are down by $1/L^2$ from the main responses in the Doppler ambiguity sidelobes. Although non-existent for in-range (or zero range), they are 1/L times the power in the main lobes for out-of-range conditions. The width of the Doppler sidelobes, as well as the main response lobes, is approximately $1/\tau_i$, where $\tau_i$ is the available integration time, that is, the time the transmitter dwells on a corresponding target.

Basically, a trade-off situation presents itself between unambiguous Doppler point $1/\tau_w$, and the unambiguous range $\tau_w$. Improving one necessarily degrades the other, assuming that the selection is made by prior art techniques for selection of $\tau_w$, etc. It will be noted that the available integration time on target $\tau i$ is large in comparison to the word time, $\tau_w$.

A PRC coded radar system will generally improve system performance (vis-a-vis that provided by linear FM-CW) by 15 to 30 decibels in environments of clutter and spillover. Spillover is one of the major problems associated with all CW radars, since the transmitter operates continuously and therefore, inevitably contributes some energy to the receiver input during receiving times. Reflected, close-in clutter is also a significant problem with CW radars due to the fact tha time-sharing is not possible, as with pulse radars. As previously indicated, such problems argue very strongly for the use of PRC coding in which correlation can reduce the spill-over by $1/L^2$ (30 decibels for a 31 bit code) as compared with unmodulated CW radar (all else held constant). Out-of-range clutter is down 30 decibels for a 31 bit code (because of correlation rejection) below that for a CW radar without PRC and that clutter is therefore negligible in its effect. In-range clutter correlates, but represents, on the average, only 1/31 of the total clutter power reflected, assuming of course, a 31 bit PRC coding as already indicated for the combination of FIG. 1. Thus, the clutter improvement is $1/L$, which amounts to 15 decibels.

The foregoing discussion highlights the basic concept in designing a system of fixed RF wavelength so as to make it unambiguous in both range and Doppler for relatively large values of both. As indicated hereinbefore, the assumed RF operating band is such that the transmitted wavelength is on the order of 3 centimeters (X-band). If the maximum velocity targets are assumed to be moving at 4000 kilometers per hour (1111 meters per second) and it is required that the unambiguous range be 80 kilometers, then the maximum Doppler frequencies expected are:

$$f_d = \frac{2V}{\lambda} = (2)\left(\frac{1111}{0.03}\right) = 74 \text{KHz}$$

Radar system design practice dictates that actual ambiguous Doppler response in a given system should not occur below about twice the expected maximum Doppler shift, therefore it follows that:

$1/\tau_w \geq 148$ KHz,
where
$\tau_w$ = code word period.

$\tau_w \geq 6.75\ \mu s$ $R_w \leq 1012$ meters

Having chosen a 31 bit maximal length code, the bit length will be seen to be approximately $1012/31 \approx 30$ meters. From that selection, a code clock frequency of 5MHz results, and a word frequency of 161 KHz, providing an in-range to out-of-range discrimination of 30 decibels (autocorrelation peak-to-sidelobe level) follows.

Looking ahead to FIG. 8, the proposed code and clock pulse train are illustrated in FIG. 8(c) and FIG. 8(b), respectively. FIG. 8(a) illustrates a typical shift-register type coder for generating the code of FIG. 8(c) from the clock pulses of FIG. 8(b). The configuration of FIG. 8(a) will be recognized by those skilled in this art as well known of itself. FIG. 8(d) is the auto-correlation function for the code of FIG. 8(c). Various characteristics of the auto-correlation function are identified in terms of $\tau_b$ (the bit duration), L (the 31 bit word length in the example being described), and the relationship between maximum and minimum response.

To this point in the discussion the design has been based on Doppler ambiguity considerations, relative improvements ratios and the selection of a reasonable number of code bits (range bins) and a reasonable bit duration. From FIG. 8(d) however, it will be evident that the unambiguous range is only 930 meters, rather than the desired 80 kilometers or more.

In order to extend the unambiguous range by a factor on the order of 80 without disturbing the design in respect to Doppler ambiguities, a triple staggered "clock system" is employed. It will be realized by those skilled in this art as this description proceeds, that the triple staggered clock frequency is selected in order to provide the desired unambiguous range capability, however, it is possible that more than three discrete clock frequencies could be employed or that only two clock frequencies might be required in connection with another given set of requirements. The manner in which such changes could be accommodated in a system such as depicted in FIG. 1 will be understood by those skilled in the art once the principles of the present invention have been thoroughly appreciated.

Returning now to the description of FIG. 1, the programmed code clock 109 will now be understood to be capable of providing three discrete sequential clock frequencies, the nominal 5 MHz frequency being midway between the first and third frequency of 5.1667 MHz and 4.84375 MHz, respectively. These number 1 and 2 clock frequencies correspond to 31/30th and 31/32nds, respectively, of the center or nominal (number 2) clock frequency of 5 MHz.

The manner in which signal processing accomplishes the identification of two target ranges and excludes ambiguous range responses will be better understood later in this description, however, a working understanding is obtainable from a functional discussion, as follows.

Assume the time on target is 20 msec for the example system; the three clock frequencies being used sequentially for approximately 6 ms each (a dead time of approximately 800 $\mu$sec is used between clock transmissions of discrete frequency to assure the receiver operates only on the selected clock).

The codes will "slip" 1 bit for each work period of the faster clock in comparison to the next slower clock. FIGS. 9(a) and 9(b) illustrate the process between two clocks where $\tau_{w_2}$ is the word period for the slower clock (No. 2) and $\tau_{w_1}$ is the word for the faster clock (No. 1). After the first word, the bits of code No. 2 lose approximately 1 bit per successive word over code No. 1. This occurs for 31 words and then repeats. For the clocks selected, this would give an unambiguous range of approximately $30 \times 31 = 930$ bits or 930 bits $\times$ 30 m/bit $\approx 30$ kilometers.

As an example of how the ambiguity is resolved, assume a target at 20,075m. This target will show up on the 19th bit of clock No. 2 (5 MHz) in accordance with the following calculations:

$$\frac{20,075m}{930 \text{ m/word}} = 21\frac{19}{31},$$

or 21 full words plus 19 bits. Similarly, the target will show up on the 10th bit of clock No. 1 (5.167 MHz) from:

$$\frac{20,075m}{900 \text{ m/word}} = 22\frac{10}{31},$$

or 22 full words plus 10 bits. FIG. 9, which is otherwise self-explanatory, depicts this situation.

In an actual surveillance situation, the targets would show up on bits 19 and 10 as shown and the range to the target would be determined as follows: Since the target lies in the 19th and 10th bit which are coincident, it is seen that the words slipped $10 + (31-19) = 10 + 12 = 22$ bits with respect to each other. Because a 1 bit slip occurs every word, the target range is calculated as 22 words of clock No. $1 + 10$ bits, or $(22 \times 900m) + (10 \times 29m) = 20,090m$ where 900m is the word and 29m is the bit range for clock No. 1 (5.167MHz). A bona fide (unambiguous) target satisfies both criteria. The answer is within 15m or ½ bit of the assumed target position of the target.

Because clocks Nos. 1 and 2 give an unambiguous range of only 30 kilometers, a third code clock must be added. The addition of clock No. 3 (4.843 MHz) will extend the unambiguous range to greater than 80 km by essentially the same reasoning.

Returning now to FIG. 1, the PRC words generated by the five stage coder 110 at the three different clock frequencies provided by the program code clock of 109, $f_1$, $f_2$ and $f_3$, provide this "multiple clock" transmitted signal modulation through the bi-phase modulator 103. The spectral representation on FIG. 1 at the output of 103 is that shown in more detail in FIG. 2. From this the shape of the transmitted spectrum is well understood. From here, power amplifier 104, which may comprise a device selected from the existing variety of microwave amplifiers rated for wideband CW operation, receives the output of 103 and provides the transmitting antenna 105 with high power signals consistent with the range requirement, etc. It will be realized that, since power amplification is provided by 104, that the X-band oscillator 101 may be a relatively low power device.

The IF oscillator (coho) 107 provides a stable signal in the IF domain for use in developing the I and Q signals in the video domain (block 117), which will be described subsequently. Coho 107 also provides an IF domain signal to mixer 108. Coherent operation of the transmitter and receiver is assured by the use of a very stable crystal controlled oscillator at 107, generating a signal typically at 30 MHz. This signal from 107 effects the phase locking of the output signal from 108 (which, in turn, is a local oscillator signal for mixer 112) to the exact coho frequency offset from the transmitter X-band oscillator frequency received through power divider 102 into mixer 108. Power divider 102 might typically have a power division capability on the order of −20dB. Mixer 108 may typically comprise a crystal VCXO multiplier chain, with microwave output to generate the aforementioned local oscillator signal for receiving mixer 112.

Antennas 105 and 106, the transmitting and receiving antennas, respectively, comprise a pair of directive surveillance antennas constructed to provide the required beamwidth in azimuth and elevation. The present system is adapted to either fan-beam or pencil-beam operation, and it is well understood in this art, that the separate transmit and receive antennas 105 and 106 can be mounted on an antenna pedestal 128, and mechanically slaved together by a linkage 127 insofar as pointing angle is concerned. In such arrangements, transmit-to-receive antenna isolation on the order of 100dB is obtainable (i.e., for free-space performance).

Received signals on antenna 106, are coherently down-converted in 112 and are amplified in the wideband IF amplifier 113, typically, for the parameters chosen in this example, the bandwidth of amplifier 113 would be on the order of ± 10 MHz or more about the nominal IF center frequency $(f_{if})$ of 30 MHz.

A code delay or shift register 111 having 31 bits of capacity, that is, to accommodate one entire PRC word receives the "local code" from 110 and has 31 taps B1 through B31, i.e., on each corresponding to one of the successive bit positions within 111. Thereby 111 "spreads out" the entire code word along its taps. The bi-phase demodulators of which 114, 115 and 116 are typically, are arranged to act discretely, each in connection with a corresponding bit position in 111. Thus, there are 31 parallel range channels beginning with the output of IF amplifier 113. The output connections of 111 from B2 through B30 have been omitted from the drawing to avoid confusion, however, it is to be understood that each of those leads from 111 applies its code bit to a corresponding one of the 31 bi-phased demodulators.

Each of these demodulators feeds a discrete train, including a clutter notch filter, such as 119, a narrow band IF amplifier 118 and an I and Q mixer with outputs to a commutator 110, as shown. Again, to avoid confusion, these components are illustrated only between the output of bi-phase modulator 115 and commutator 110.

Considering FIGS. 4 and 5, which are quite self-explanatory, the bi-phase demodulation action, along with the effect of the post-detection filtering (at IF), may be appreciated graphically. FIGS. 4 and 5 depict the situation with respect to a in-range target (correlated) and out-of range clutter (uncorrelated), respectively. Similarly, FIGS. 6 and 7 make the same presentations for in-range clutter or spillover and an out-of-range target, respectively. These too, are entirely self-explanatory.

It will be realized that the receiver common circuits and the multi-channel processing beginning with the bi-phase demodulators 114, 115, 116, etc., are selected to be compatible with PRC operation, in respect to bandwidth requirements, decoding, etc.

The mixer 112 having down-converted the PRC's spectrum to a 30 MHz IF center frequency, requires that the IF amplifier 113 accept the PRC spectrum which has a bandwidth on the order of 10 MHz. The mixer 112 may be of a commercially available "image enhancement" type of balance mixer. That device has a favorable noise figure for X-band operation and may have an instantaneous bandwidth of as much as 1 GHz. The gain of the wideband IF amplifier 113 (which also must be capable of accommodating a high dynamic signal range) is only as much as necessary to sustain the system noise figure and to adequately drive the 31 PRC decoder channels in parallel.

Each of the PRC decoders (bi-phase demodulators) 114, 115, 116 etc., is preferably a known type double-balanced mixer type device, and it will be realized from FIG. 1 that each performs its decoding function in respect to a single digit from the code delay device 111. Thus, each of these PRC decoding channels serves as a unit or "bin" of the contiguous range coverage provided by the system. Bit-width delay is mandatory as opposed to absolute time delay, since multiple frequency clocking is used in the system for range ambiguity resolution, and this type of delay is inherently provided by the code delay device 111.

Following the PRC decoding (auto-correlation) the receiver signals can be treated as Doppler-shifted CW (as shaped by time-on-target). Clutter and spillover notch filtering becomes feasible at this point in the signal processing. Range bin B1, always contains the transmitter spillover, but that signal is attenuated 30 dB (auto-correlation gain) in all of the other range bins (for a 31 bit PRC word length). Accordingly, notch filtering of the crystal type is mandatory following the bi-phase demodulator 114 (corresponding to range bin B1) to prevent saturation of the IF channel circuitry to follow.

Crystal notch filtering may be also implemented in all of the other 30 channels to protect against close-in ground clutter IF saturation in practical operational environments. Accordingly, the dynamic range requirements of the subsequent signal processing circuitry are thereby reduced. The crystal notch stop band will be approximately ± 3 KHz around the 30 MHz center frequency for a typical implementation.

In connection with the foregoing, the clutter notch filter 119 and subsequent narrow-band IF amplifier 118 are typical of the other 30 channels. Accordingly, each I and Q mixer, of which 117 is typical, mixes down to the video frequency domain in I and Q form from the output of the corresponding narrow-band IF amplifier (for example from 118) against the crystal coho oscillator 107. It is well understood in this art that in order to obtain the I and orthogonal Q video signals, the coho reference signal is supplied in both 0 and $\tau/2$ phases in order to extract the I and Q video.

At this point it will be realized that the commutator 110 is presented with 31 pairs of I and Q signals, and since the system is of the CW type, these signals (if present at all) are substantially continuous. Accordingly, they are adapted to being sampled by the commutator 110 receiving the multiple clock frequencies from 109 via lead 130. It will be realized that the dwell time of the commutator 110 on each of the 31 I video lines in the reciprocal of the clock frequency (200 nanoseconds per line at the nominal [center] 5 MHz clock frequency).

Another set of like circuits in the commutator 110 can handle all the Q video lines in a corresponding manner at the identical data rate and therefore, both I and Q data commutations may be said to be slaved together and controlled by clock pulses on lead 130. An index pulse is also included in the connections from 109 to 110 to identify the first range bin B1 frame start.

The output of the commutator 110 comprises a single pair of I and Q video lines comprising the successive samplings of the 31 previous channels. Analog-to-digital converter 120 simply converts each of these successive samplings into a digital number continuously representing the instantaneous amplitude of the signal in each bit direction (range bin). Thus, in the context of the parameters of the embodiment being described, the dwell time within the commutator 110 on each bit is 200 nanoseconds and during this time the analog-to-digital converter 120 generates a corresponding digital number. A/D converter 120 is seen to receive a clock signal on lead 129.

The analog-to-digital converter 120 output provides the input to a 128 point fast Fourier transform (FFT) computer. Here a Doppler value resolution is obtained for each range bin. Nominal (unweighted) FFT Doppler resolution is 1260 Hz. Continuous coverage is provided for all Dopplers of interest, over the total range of − 75 kHz to + 75 kHz, with ± 3 kHz notched out in the receiver as hereinbefore described in discriminate against spillover and clutter. A total of 128 readings of each range bin (at the clock rate) are processed coherently to yield Doppler data. Non-coherent integration, of eight groups of 128 readings each, is then performed during each one third of the time on target (approximately 6 milliseconds). After this program is completed at clock frequency $f_1$, the identical program is repeated two more times during the total 20 milliseconds time on target, using the clock rates $f_2$ and $f_3$.

As has been previously indicated, the additional clock frequencies $f_2$ and $f_3$ provide for resolution of range ambiguities associated with the relatively short 31 bit PRC code, are removed by further processing of the Doppler/range data in a manner which will be more fully evident from the drawings and continued description. The presence of a target at a specific Doppler can be noted at specific range bin numbers which change in an entirely unique way with the change in clock frequency from $f_1$ through $f_3$. The resulting unique data matrix is decoded by the range/Doppler processor which comprises the FFT computer 121 the filter/detector 122 and the range ambiguity processor 123. The display processor 124 and the display 125 itself are not a part of the combination of the present invention, but are illustrated for the sake of completeness of the system. The display processor 124 may provide synthetic video pulses in unambiguous range and may coordinate with the sweep circuits of the display 125 to present a numerical display of Doppler (V) as well as various other symbols, as may be required or desired on the face of the display 125. The range signal (R) to display 125 is that typically associated with PPI type radars.

The slaved rotation of transmitting and receiving antennas 105 and 106 is effected by a mechanical rotational device in antenna pedestal 128 in a well known manner and the azimuth reference 126 suitably encodes this motion to control the sweep display angle of display 125. That function is also per se, very well known in this art.

Referring now to FIG. 12, the digital signal processing portions of FIG. 1 are depicted in more detail. The showing of FIG. 1 is expanded into a two-channel arrangement, one devoted for example, to fan-beam processing and the other to pencil-beam processing. Thus, the analog-to-digital converter 120 of FIG. 1 is depicted as two such A/D converters 120a and 120b. This two-channel processing arrangement is by way of example only, and, of course, the operability of the invention, per se, does not depend on two channel processing. The nature of the antennas and scanning arrangements of a particular embodiment and its overall system requirements, dictate such dual channel processing.

A 128 Point FFT (Fast Fourier transform) computer having 31 range bins is shown for each of these fan and pencil-beam processing channels at 121a and 121b, respectively. These correspond to 121 on FIG. 1.

Filter/detector hardware, represented as 122 on FIG. 1, will also be seen to be split into 122a and 122b on FIG. 12, as is the ambiguity processing circuitry 123a and 123b.

Before proceeding further with the description of FIG. 12 and the still further sub-system of the blocks of FIG. 12, the following Table I is given to summarize the signal processor requirements in a typical implementation of the present invention, as is being described.

typically depicted for the situation of three pulses non-coherently correlated over each beamwidth.

The so-called FFT processing filter bank circuits as aforementioned operate over the aforementioned − 80 to + 80 kHz Doppler band. FIG. 11 illustrates the operation of clutter and spillover rejection by that filtering.

Range-Doppler ambiguity processing can start as soon as the detection process has been completed, i.e., in 122a and 122b. Data from the period T$i$−1 is loaded into the range-Doppler ambiguity memory units during group number 1 time of period T$i$. FIG. 15 represents a

TABLE I

| GENERAL | |
|---|---|
| COHERENT INTEGRATION: | 128 PT FFT PROCESSOR |
| NON-COHERENT INTEGRATION: | 8 GROUP INTEGRATOR |
| RANGE-DOPPLER CORRELATION: | 3 PERIOD-AND-CORRELATOR |
| FILTER BANDWIDTH | 1.3 KHZ |
| DOPPLER COVERAGE | −80 KHZ TO +80 KHZ |
| RANGE | 0 to 80 KM |
| INPUTS | |
| PERIOD SAMPLE FREQUENCIES: | f1, f2, f3 |
| PERIODS PER BEAMWIDTH | 3 |
| GROUPS PER PERIOD: | 8 |
| SAMPLES PER GROUP: | 128 |
| RANGE BINS PER GROUP: | 31 |
| A/D CONVERSION RATE: | ∼0.2 μSEC |
| DYNAMIC RANGE | 6 BITS I |
| | 6 BITS Q |
| PROCESSING | |
| SIDELOBE SUPPRESSION: | 30 DB |
| FFT FILTERS: | 128 |
| FFT DYNAMIC RANGE: | 13 BITS I |
| | 13 BITS Q |
| POST FFT INTEGRATION GROUPS: | 8 |
| POST FFT INTEGRATOR DYNAMIC RANGE: | 16 BITS |
| UNAMBIGUOUS RANGE | 80 RADAR MILES |
| OUTPUTS: | |
| PPI | 80 RADAR MILE FAN BEAM |
| | 80 RADAR MILE PENCIL BEAM |
| PSI | 128 FAN BEAM DOPPLER FILTERS |
| | 128 PENCIL BEAM DOPPLER FILTERS |
| SPECTRUM: | SELECTABLE DOPPLER SPECTRUM: |
| | FAN: BINS 1-31 |
| | PENCIL: BINS 1-31 |

A combination of coherent and non-coherent integration is used to achieve the necessary signal-to-noise ratio to support the required probabilities of detection and of false alarm. Doppler discrimination is based on 128 filters of approximately 1.3 kHz bandwidth. The filters cover the Doppler frequency band from − 80 kHz to + 80 kHz. The input, processing and output requirements of the signal processing arrangement of the example being described are those listed in the foregoing Table I.

In the signal processing effected in FIG. 12, there are three discrete contiguous time periods T$i$−1, T$i$, T$i$+1, corresponding to the three time spans of corresponding clock frequencies during a one-beam-width interval. The program of three discrete clock frequencies is repeated after every third time period. Because of the high data rates, parallel processing is used. For example, four 128 point FFT processors are used to process the eight groups of data samples during period T$i$−1. There is a one group delay between collection and processing, such that group data of T$i$−1 time is processed during group three time of the period T$i$−1. The non-coherent integration process is overlapped with the FFT processing and the actual threshold detection for the non-coherent sum of the eight groups of period T$i$−1 is performed during group number one of period T$i$.

At this point is helpful to refer to the largely self-explanatory FIG. 10 in which time relationships are further elucidation of the contents of 123a and 123b from FIG. 12. Sixteen shift decoders, the first and 16th of these being illustrated at 1505 and 1506, respectively on FIG. 15, each processes a discrete portion of the Doppler velocities. This is more evident from FIG. 16. Each of the blocks 1501 through 1504 from FIG. 15 contains the shift register circuitry depicted in FIG. 16. The 16 shift register decoders of FIG. 15 each may be seen to operate on a discrete portion of the Doppler spectrum of interest as also depicted in FIG. 16.

Each of the shift decoders of FIG. 15 of which 1505 and 1506 are typical, comprises the circuitry shown in further detail in FIG. 17. The manner in which these shift decoders, according to the details of FIG. 17, operate to eliminate range ambiguous signals is graphically illustrated in FIG. 18.

The digital processing hardware thus illustrated will be recognized by those skilled in this art as being typical of pipelined processing techniques. For example, data enters the signal-processing pipeline during one period T$i$−2, is operated on for three clock periods and is finally displayed in a following period (T$i$+1). Once the pipeline is filled, data exits at the same rate as which it enters.

The digital FFT processor may be thought of as transforming a sampled data sequence consisting of 128 complex data points into a spectrum of 128 discrete complex frequency responses or filters. These filters span the unambiguous Doppler frequency range from −Fs/2 to +Fs/2 where Fs is the sampling frequency of the sampled data sequence. The frequency response of the transform, when all input samples have uniform weighting, is of the form [sin x/x]. This response produces unacceptably high sidelobes however, which limit the Doppler resolution capability of the individual filters. The sidelobe-mainlobe response of the individual filters in the frequency domain can be altered by weighting the input data samples in the time domain. This procedure is referred to as time weighting. The processor is implemented using Chebychev time weighting which produces an ideal response for frequency discrimination, since constant sidelobes are achieved with a minimum broadening of the mainlobe. Sidelobes will be suppressed to 30dB. This weighting, which of itself is well understood in this art, is provided by 204(a) and 204(b). Those skilled in this art will understand the form of these weighting circuits from the foregoing.

The 128 point Discrete Fourier Transform (DFT) Processor is typically implemented using the Cooley-Tukey Fast Fourier Transform (FFT) algorithm. This algorithm replaces the 128 by 128 discrete Fourier Transform matrix with a series of seven 128 by 2 discrete Fourier Transform matrices. These 2 point or Radix 2 DFT matrices can be implemented using addition and subtraction with no multiplication required. A vector rotation or complex multiplication operation is required between each pair of Radix 2 matrix operations; however, the total number of complex multiplications (and additions and subtractions) is significantly reducing using the Cooley-Tukey algorithm, and it is therefore appropriately referred to as a "Fast" FFT arrangement. Other derivative FFT algorithms which use both Radix 4 and Radix 8 matrix operations have been developed which require even fewer multiplication operations than the Radix 2 algorithm for specific input sequences. While the Radix 2 algorithm is employed in the system of the present invention, it will be understood that the invention is by no means limited thereto.

The Coolet-Tukey algorithm transforms a natural binary ordered time sequence into a reverse binary ordered frequency sequence. Since the Doppler information will be displayed for the operator, it is necessary that the FFT processor reorder the data into a natural binary sequence. The spectrum contains both negative and positive Doppler frequencies. These are separated out and arranged such that the most negative Doppler frequency is displayed first and the most positive Doppler frequency is displayed last (i.e., F65, F66 . . . F127, F0, F1 . . . F63, F64).

The Cooley-Tukey algorithm forms a frequency spectrum with complex components, i.e., each Doppler filter has two quadrature components (I,Q) as described herein. These two components are combined into a single rms amplitude by an rms magnitude converter which forms the rms sum using the approximation: rms = max $(I,Q)$ + $\frac{1}{2}$ min $(I,Q)$.

The inputs to the FFT processor (as already described) consist of an I sample and a Q sample each expressed as a 6-bit number (sign + 5 bits). The increase in dynamic range (signal-to-noise) produced by the FFT is accommodated by increasing the dynamic range of the quadrature components 1 bit each for each of the seven steps of the FFT algorithm. This produces two 13-bit quadrature components which are combined into a single 13-bit amplitude by the rms converter.

The foregoing digital parameters apply to FIGS. 12 et seq. specifically. The processor has the capability of processing 31 range bins of data in real time. It uses four FFT 128 point processors to accommodate the data rate imposed by the assumed system requirements. The A/D converters 120(a) and (b) convert I and Q samples to two 6-bit numbers each 0.2 μ seconds (on the average) under control of a sample pulse which operates at one of three frequencies. The converted samples are time weighted in this time weighting multipliers 204(a) and (b) (see also FIG. 13, where multiplier is shown at 1340). Memory 1331 stores the 64 real weights in a read-only memory form. The time weighted data is sent to one of four buffer memory units 1332, 1333, 1334 and 1335 of FIG. 13 on a range-gated basis. Each buffer memory has an associated FFT processor which must calculate a 128 point FFT over 31 range segments (6.2 μs) with reordered output in less than 100 μ secs. (Eight range channels in μ sec × 128 or 800 μ sec for each of four FFT processors). The outputs from the four FFT processors are magnitude converted, range ordered and transmitted for non-coherent integration in the Filter Integrator and Detector Units 122(a) and 122(b) of FIG. 12, fan beams and pencil beam processing chains are identical in these functions.

The blocks 122a and 122b, as depicted on FIG. 12, receive the rms values from 206a and 206b, and these are processed in accordance with the details of those blocks as depicted on FIG. 14.

These filter integrator and detector units non-coherently integrate the 31 range bins over eight FFT groups (128 filters per group), and threshold detect the sums to produce 31 serial bit streams of 128 bits each for each of the fan and pencil beam channels.

The output of the FFT processor will consist of eight groups of coherently integrated data for each of three contiguous periods which constitute one (3dB beamwidth of the radar, i.e., approximately 20 ms.). Each group contains 128 filter amplitudes for each of 31 range bins. Each filter amplitude is represented as a 13-bit magnitude.

The filter integrator and detector unit detailed in FIG. 14 is used to sum the eight inputs for each of 128 filters for each of 31 range bins. A 16-bit accumulator 1401 is sufficient to accumulate (sum) eight 13-bit numbers. A shift register memory within 1401 is used to provide a total of 128 × 31, 16-bit accumulators. Data from the rms converter is added to the accumulated sum in 1403 for each filter for each range bin. During the eighth group, the output of the adder is passed to a threshold detector 1402 where the sum is compared to a digital threshold. When the sum exceeds the threshold, the output of the detector 1404 is set to 1, otherwise it is set to 0. Therefore, the non-coherently integrated sum for 128 filters for a given range bin is reduced by the detection process to a 128 bit serial word in which threshold crossings are represented by 1 and non-crossings by 0. The detector unit produces 31 of these 128 bit serial words for each group and passes them sequentially to the range-ambiguity Doppler processor. During the first group of each eight-group period, the accumulator input to the adder is forced to zero, by operation of multiplexer circuit 1405 to clear out the sum from the previous period.

The range-Doppler ambiguity processor correlates 31 range bins of data for each of 128 filters across 3 transmitted (clock) frequencies to extract unambiguous range data out to at least 80 km, as a logic process previously referred to.

The range-Doppler ambiguity processor correlates three packets of range-Doppler data (each packet of which was collected at a different frequency), and determines the unambiguous range at which detected targets occur out to a range of at least 80 km. Unambiguous range data and Doppler data are outputted to the display processor for formation prior to display.

From the block diagram of the range-ambiguity processor FIG. 15, it will be seen that the processor consists of 4 memory units 1501 through 1504 and 16 shift decoders (typically 1505 and 1506). Three of the memory units contain data from the last three packets across which the shift decoder correlation process will operate. The fourth memory unit serves as a buffer memory unit which is loaded with the next packet of data as the correlation process is proceeding with the previous three packets.

The memory unit, shown in FIG. 16, consists of 31 shift registers each 128 bits long. These registers are loaded sequentially by the filter integrator and detector unit with 31 words of 128 bits each. Sixteen sets of taps of 31 bits per tap drive the 16 shift decoders. Since a packet of data will be used in three separate correlations, the 128 bit shift register is mechanized using 16 eight-bit shift registers which operate as a single 128 bit shift register during loading and as 16 eight bit end-around shift registers during processing.

The shift decoder (any of the 1505, 1506 units) shown in FIG. 17, consists of three multiplexers at the input, 1701, 1702 and 1703, three 31 bit end-around shift registers 1704, 1705 and 1706, an AND gate 1707 and a pulsewidth discriminator 1708. The multiplexers enable the shift registers to select any three of the four memory units. Data collected at frequency $f1$ is always loaded into the 31 bit shift register which has the $f1$ shift clock applied to it. Similarly, $f2$ and $f3$ data are loaded in the appropriate registers. The sixteen shift decoders will correlate 16 of the 128 filters; eight passes of the decoders will be required to correlate all 128 filters.

The timing diagram for a portion of one pass of one shift decoder is shown in FIG. 18. An ambiguous target is shown to be in the be in the first range bin of the first ambiguous range interval (or word). Once the three 31-bit shift registers have been loaded with a filter's data from each of three packets, the 3-input coincidence AND gate 1707 is applied to bit 1 of the 31 bit register. As previously discussed, the clock periods $f1$, $f2$ and $f3$ are related as follows:

$$30f_1 = 31f_2 = 32f_3$$

These three frequencies are applied to the shift registers and the three 31 bit patterns are shifted in an end-around fashion. In the example cited, coincidence will occur at bit number one after 31 clocks have been applied to shift register one. This is the only time (range) coincidence will occur between 0 and 80 km.

A pulsewidth discriminator is used to suppress digital switching spikes such that the minimum pulsewidth passed is equal to the minimum pulsewidth transmitted. A latch is provided to "remember" if any range bin in the 80 km sweep produced a correlation. The output of the latch is passed to a Doppler memory in the display processor. The time ordered range data is passed to the range memory in the display processor.

Since the signal processor is a fully digitized device, the timing and sequencing controls are all basically provided synchronously from the program code clock 109, as symbolically indicated at 205 on FIG. 12.

The mechanization of the logic circuitry described, including the application of timing, selection and sequencing functions as described is readily accomplished by those skilled in the digital computer arts.

It has previously been indicated that other forms of Foiurier transform computer are possible within the scope of the present invention. From an understanding of the system requirements and the signal processing circuits described herein, this fact will be apparent to those skilled in this art. In fact, whereas the basic three-clock logic circuits of elimination of range ambiguities may be also otherwise instrumented, nevertheless, in basic concept, this ambiguity logic sub-system is an essential part of the combination of the invention. Still further, the Doppler determination and the elimination of Doppler ambiguities could even be instrumented in purely analog form although this would be considered inefficient and unduly cumbersome in such a system.

For the reader's background information, re patent literature in the area of digital radar equipment, coherent pulse Doppler radar, and FFT digital processing, U.S. Pat. Nos. 3,406,396; 3,441,930; 3,725,923 and 3,778,604 are among the particularly pertinent prior art.

Various additional modifications of the circuits and sub-systems of the embodiment described herein will suggest themselves to those skilled in this art. Accordingly, it is not intended that the drawings and this description should be regarded as limiting the scope of the present invention, these being intended to be typical and illustrative only.

What is claimed is:

1. A CW pseudo-random coded radar system including transmitting means for generating a CW carrier transmission modulated by a maximal length code PRC code and including receiving means responsive to echo signal energy reflected from objects illuminated by said transmitting means, comprising:
    first means for generating said code as a repetitive pseudo-random digital code word of L bits each $\tau_b$ in duration, said first means also including a modulator for applying said code word as a bi-phase code to said carrier;
    clock means connected to control said first means, the frequency of said clock being programmed in at least two predetermined clock frequency periods;
    second means responsive to said first means for delaying said code by L $\tau_b$ and having L taps spaced $\tau_b$ to provide L delay outputs;
    third means comprising L demodulation channels, each of said channels arranged to correlated signals from said receiving means against a corresponding one of said demodulator channels;
    and fourth means responsive to the outputs of said L channels for producing a composite signal comprised of successive samplings of the outputs of said L channels.

2. A system according to claim 1 in which said receiving means includes means for coherent detection of said echo signal energy, thereby to provide coherent signals to said third means.

3. In a CW pseudo-random coded radar system, including transmitter, receiver and a code generator for producing a repetitive maximal length digital code sequence of duration $\tau_w$ for modulating the carrier of said CW system and for providing a local code against which the echo signals are correlated by a correlation detector to produce decoded output signals, the combination comprising:

a clock device having a frequency which is programmed to provide at least two discrete clock frequencies each extant over a corresponding clock frequency period, said clock device being arranged to drive said code generator such that said code has a corresponding bit duration $\tau_b$, where $\tau_b = 1/f_c$, said $f_c$ being the clock frequnency at any time;

and range ambiguity resolving means responsive to said correlations, said means including logic circuitry for identifying unambiguous target correlations occurring in synchronism with different bits of said code but in time coincidence with each other.

4. A system according to claim 3 in which said code contains L bits comprising a digital word having a duration $\tau_w = L \tau_b$, and said discrete clock frequencies differ from each other by an amount sufficient to cause said $\tau_w$ to be correspondingly different by an amount substantially equal to $\tau_b$ at one of said frequencies.

5. A system according to claim 4 in which said code word length $\tau_w$ is selected such that $1/\tau_w$ is greater than the maximum Doppler frequency associated with any echo signal for which unambiguous Doppler determination is required.

6. A system according to claim 3 in which said code word length $\tau_w$ is selected such that $1/\tau_w$ is greater than the maximum Doppler frequency associated with any echo signal for which unambiguous Doppler determination is required.

7. A system according to claim 3 further comprising; code delay means having a total delay $\tau_w$ and L taps spaced $\tau_b$ along said delay means thereby to provide a discrete output corresponding to each of the L bits of said code, L channels with said correlation detector each responsive to a discrete corresponding one of said delay means taps and to the signal output of said receiver, thereby to provide the correlation detection function separately for each code bit; and means for combining the outputs of said L correlation detector channels to produce a continuous correlated output signal.

8. A system according to claim 5 further comprising; code delay means having a total delay $\tau_w$ and L taps spaced $\tau_b$ along said delay means thereby to provide a discrete output corresponding to each of the L bits of said code, L channels with said correlation detector each responsive to a discrete corresponding one of said delay means taps and to the signal output of said receiver, thereby to provide the correlation detection function separately for each code bit; and means for combining the outputs of said L correlation detector channels to produce a continuous correlated output signal.

9. A system according to claim 8 in which said carrier modulation is bi-phase and in which said L channels each includes a $0/\pi$ phase demodulator responsive to a corresponding one of said delay means taps, all of said demodulators being also responsive to said receiver output, and in which the outputs of said demodulators each includes a notch filter for eliminating clutter signal energy.

10. A system according to claim 9 in which said receiving means includes means for coherent detection of said echo signals, has an output in the IF domain and each of said L correlation channels includes a mixer for providing at least one of an I and Q pair of video outputs for each of said L channels.

11. A system according to claim 8 in which said means for combining the outputs of said L correlation detector channels comprises a commutator for sampling the outputs of said channels repetitively according to a predetermined pattern to produce said continuous correlated output signal.

12. A system according to claim 10 in which said means for combining the outputs of said L correlation detector channels comprises a commutator for sampling the outputs of said channels repetitively according to a predetermined pattern to produce said continuous correlated output signal.

13. A system according to claim 12 in which said predetermined repetitive pattern for sampling in said commutator is that resulting from communication at the frequency of said clock.

14. The combination as defined in claim 13 further comprising means within said commutator for providing both I and Q outputs, an analog to digital converter responsive to said commutator outputs for converting said I and Q commutator output signals to digital form, and in which said range ambiguity resolving means includes a digital processing arrangement responsive to said digital I and Q commutator outputs, said digital processing comprising a shift decoder correlation process for effecting said coincidence for identifying umambiguous target ranges.

15. The combination according to claim 14 further including an FFT device responsive to the output of said Analog-to-digital converter and a filter-detector device following said FFT device to provide said range ambiguity computer with substantially only echo signals having substantial Doppler frequency components.

* * * * *